Nov. 1, 1938.  E. F. PAWSAT  2,135,217
LUGGAGE CARRIER FOR BICYCLES AND THE LIKE
Filed Sept. 9, 1936
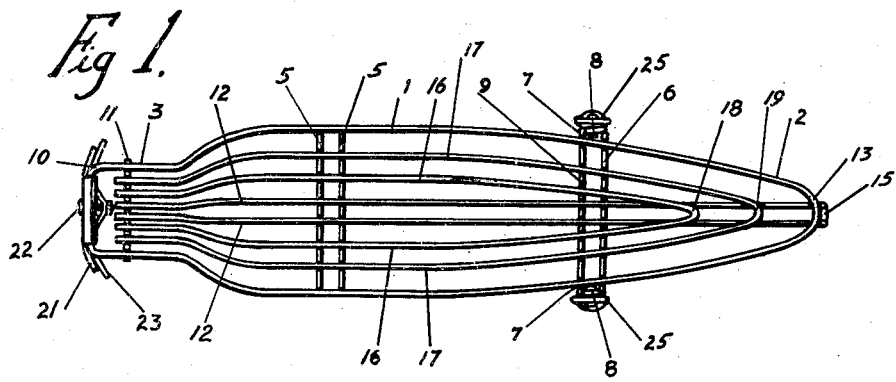
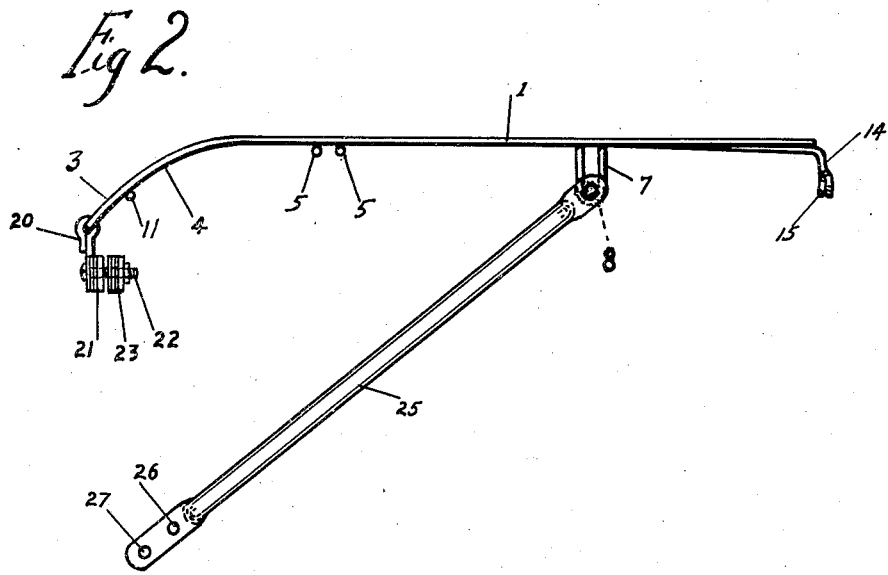
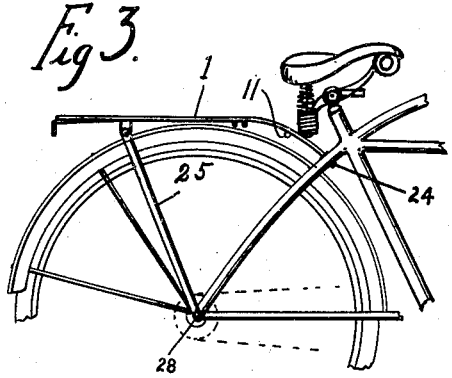
Inventor
Ewald F. Pawsat.
By Arthur H. Ewald
Attorney Patented Nov. 1, 1938

2,135,217

UNITED STATES PATENT OFFICE 2,135,217

LUGGAGE CARRIER FOR BICYCLES AND THE LIKE

Ewald F. Pawsat, Maysville, Ky., assignor to Wald Manufacturing Company, Incorporated, a corporation of Kentucky Application September 9, 1936, Serial No. 99,951

1 Claim. (Cl. 224—39)

The present invention relates to luggage carriers for bicycles and similar vehicles, of the type arranged to be supported over the rear wheel of the vehicle.

The principal object of my invention is to provide a simple, efficient and durable carrier of the type mentioned.

A further object of the invention is to provide a luggage carrier of the type mentioned which is of light and flexible construction, it being thus adapted to be attached to the vehicle without adding materially to the weight thereof, or otherwise effecting its operation.

Another object of the invention is to provide a luggage carrier for a vehicle of the type mentioned which is of comparatively narrow and stream-lined construction, thus presenting no obstacle to the operation of the vehicle or to the movements of the operator when mounting or dismounting.

A still further object of the invention is to provide a luggage carrier which adapts itself readily to securing parcels or luggage of various shapes thereon.

In the drawing:

Figure 1 is a plan view of the luggage carrier constructed in accordance with this invention.

Figure 2 is a side elevation of the luggage carrier.

Figure 3 is an elevation showing the carrier attached to a bicycle.

The numeral 1 indicates the outer frame of a luggage carrier constructed in accordance with this invention. Said frame is constructed of a continuous wire and is generally oval in shape, tapering out sharply to the rear, however, as shown at 2, and being provided at the front end with a substantially rectangular end section 3. As shown at 4 in Figure 2 the front end of the frame 1 including the end section 3 curves downwardly. Secured to the frame are two cross wires 5—5 the same being located slightly to the rear of the downwardly curved section 4. Also secured to the frame 1, approximately half way between cross wires 5 and the rear of the frame is a wire 6 which is bent downwardly to form end loops 7—7, and depending eyes 8—8; the ends of the wire 6 are brought together to form a cross member 9 parallel to 6. Slightly to the rear of the front end 10 of the frame 1 a cross wire 11 is secured to the frame. The cross wires 5, 6, 9 and 11 are all secured to the under side of the frame 1. Secured to the upper sides of cross wire 11, 5—5, 9, and 6 is a central looped wire 12, the free ends of said wire terminating slightly in front of cross wire 11. The rear end of the wire 12 extends under the rear end 13 of the frame 1 and has a depending loop 14 into which an eye 15 may be formed. The respective sections of the wire 12 are substantially parallel as shown in Figure 1 and extend approximately along the longitudinal axis of the frame. Looped wires 16 and 17 are secured to the upper side of cross wires 11, 5—5, 9, and 6, the rear looped ends 18 and 19, respectively, of said wires extending over and being secured to the respective sections of wire 12. Pivotally secured on the front end 10 of the frame is a plate 20 having a clamp section 21. The section 21 is perforated for a bolt 22 and is arranged to cooperate with a complementary clamp plate 23 for securing the front end of the device to the frame 24 of a bicycle. Supports 25 are arranged to be pivotally secured in the eyes 8 of the cross wire 6. The free ends of said supports are provided with perforations 26 and 27 either pair of which is adapted to fit over the ends of the rear axle 28 of the vehicle.

From the foregoing description the nature and uses of my new luggage carrier will be apparent. The carrier is secured to a bicycle or similar vehicle by means of the clamp plates 21 and 23 which are adapted to engage the frame members of the vehicle to secure the front end; the supports 25 are then secured to the rear axle on opposite sides of the rear wheel. The carrier thus secured is extremely flexible both in its inherent construction and also by means of the pivotal mounting at plate 20 and on the upper ends of the supports 25. By reason of the open construction of the body of the carrier it will be seen that straps or cords may be secured substantially at any pont thus permitting the user properly to secure parcels or luggage of various shapes and sizes on the carrier. The pairs of perforations 26 and 27 in the supports, adapt the device to wheels of various sizes.

It will be noted also that the tapering oval construction of the body presents a stream-lined effect and one which, while serving adequately for the mounting of luggage, may yet be so narrow and unobtrusive as to present practically no interference with the movements of the operator while mounting or dismounting from the vehicle.

Having thus fully described my invention, what I claim as new and desire to secure by Letters Patent is:

A luggage carrier of the type specified comprising a continuous wire frame of substantially oval shape, the front end of said frame being curved downwardly and terminating in a substantially rectangular section having a straight transverse end, cross wires secured to the under side of the oval portion of said frame, one of said cross wires being formed with depending eyes, a cross wire secured to the under side of the rectangular front of said frame parallel with the end section thereof, a double bent wire disposed substantially along the longitudinal axis of said frame and secured to the upper sides of said cross wires, the rear end of said doubled wire extending under and being secured to the rear end of said frame, the front ends of said doubled wire being curved downwardly to correspond with the front portion of said frame, wires secured to the tops of said cross wires within said frame and conforming in shape substantially therewith, said last named wires being secured at the rear to the upper side of said doubled wire, and the front ends of said last named wires being curved downwardly to conform with the front portion of said frame, a clamping member pivotally secured to the front transverse end of said frame, a cooperating clamp element whereby said first clamp element may be secured to the frame of a bicycle, and standards secured in said eyes and adapted to be secured on rear axle of said bicycle, whereby the device is supported over the rear wheel thereof.

EWALD F. PAWSAT.